N. SIMON & N. SIMON, Jr.
COMBINED CHEESE PRESSING HOOP AND CHEESE SHIPPING BOX.
APPLICATION FILED JULY 20, 1912.

1,061,929.

Patented May 13, 1913.

2 SHEETS—SHEET 1.

WITNESSES:
Harry A. LeTourneux.
C. M. Albee.

INVENTORS.
Nicholas Simon.
Nicholas Simon jr.
BY G. N. Albee, ATTORNEY.

N. SIMON & N. SIMON, Jr.
COMBINED CHEESE PRESSING HOOP AND CHEESE SHIPPING BOX.
APPLICATION FILED JULY 20, 1912.
1,061,929.
Patented May 13, 1913.
2 SHEETS—SHEET 2.
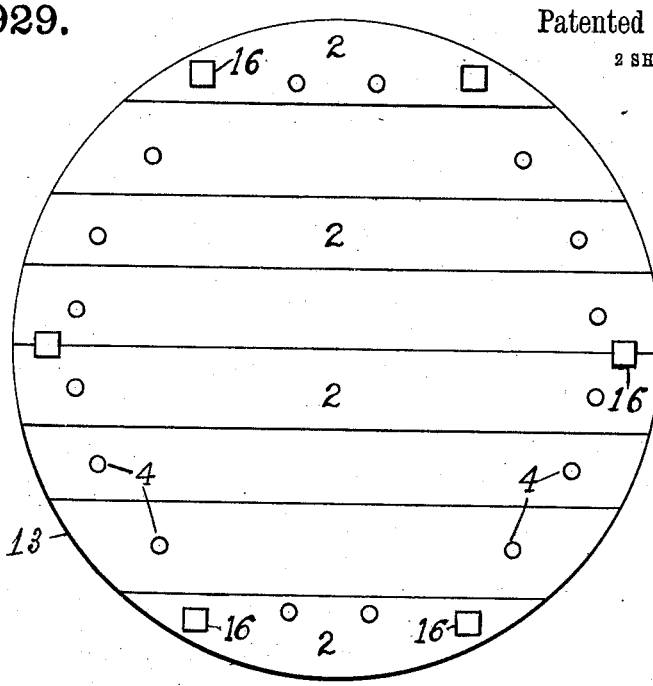
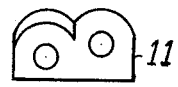
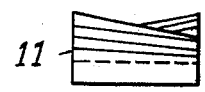
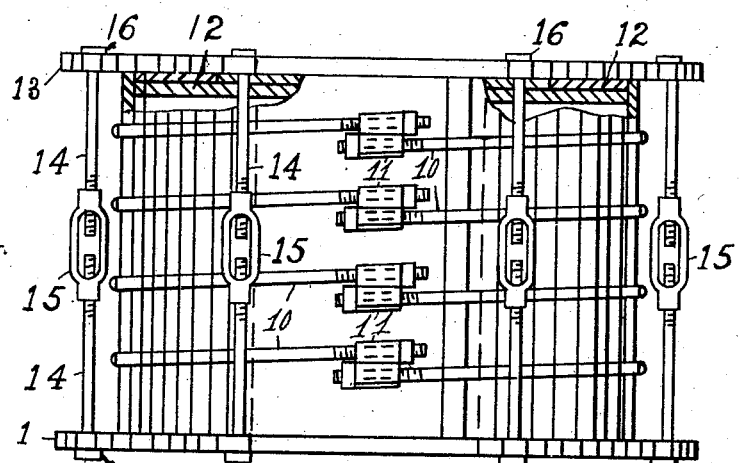

UNITED STATES PATENT OFFICE.

NICHOLAS SIMON AND NICHOLAS SIMON, JR., OF CHICAGO, ILLINOIS.

COMBINED CHEESE-PRESSING HOOP AND CHEESE-SHIPPING BOX.

1,061,929.  Specification of Letters Patent.  Patented May 13, 1913.

Application filed July 20, 1912. Serial No. 710,724.

*To all whom it may concern:*

Be it known that we, NICHOLAS SIMON and NICHOLAS SIMON, Jr., citizens of the United States, and residents of Chicago, in the county of Cook and State of Illinois, have jointly invented a new and useful Combined Cheese-Pressing Hoop and Cheese-Shipping Box, of which the following is a specification.

Our invention relates to a hoop in which to form, press, and afterward ship, extraordinary large cheese, such as are made principally for advertising purposes, are several feet in diameter and thickness, weigh several thousand pounds, and are too heavy and bulky to be handled after being pressed, excepting in the hoop in which the cheese is formed, and it consists of several novel features for a cheese pressing hoop, whereby it is made available as a shipping box for the cheese after it has been pressed in said hoop, said features being shown in the accompanying drawing, in which,—

Figure 1:
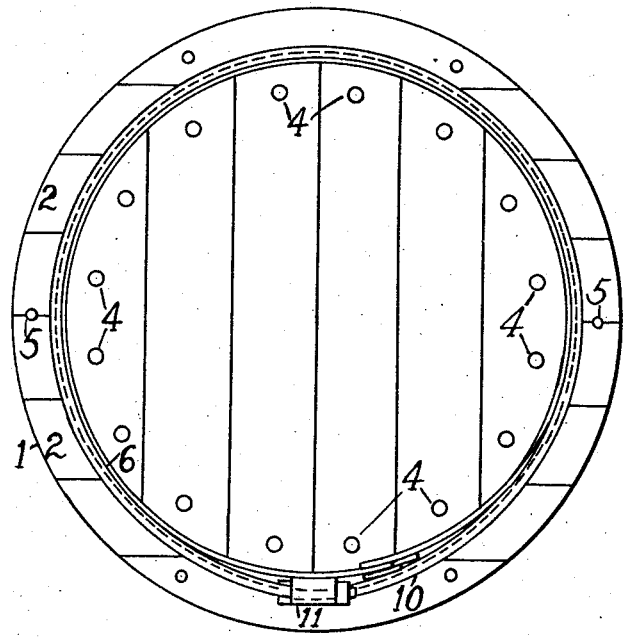
Figure 6:
Figure 5:
Figure 2:
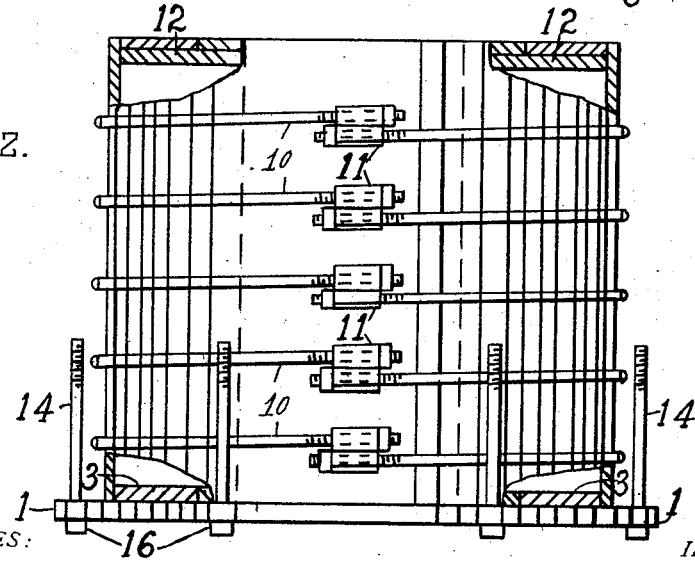

Figure 1 is a plan of the cheese hoop, showing it as arranged for receiving the curd of which the cheese is to be made, the straight parallel lines therein indicating the separate boards or planks of which the base or bottom end of the hoop is formed. Fig. 2 is a side elevation of the hoop, showing it as filled with curd with its pressing follower in position for pressing the curd, a part of its base and of its pressing follower being in section. Fig. 3 is a plan showing the cheese hoop with the cheese pressed therein and inclosed under its upper end piece or cover, ready for being shipped. Fig. 4 is a side elevation of the cheese hoop, cut down to the thickness of the cheese after it has been pressed, its base or lower end pieces and cover or upper end pieces being in position and held together with a plurality of connecting rods, the follower being partly in section. Fig. 5 is a plan showing the two ends of the sheet metal cheese hoop, and the manner in which said ends meet. Fig. 6 is a modification in the manner of their meeting. Fig. 7 is an end elevation of a coupling lug casting which is used upon the hoop. Fig. 8 is a side elevation of said coupling lug. Figs. 5, 6, 7 and 8, are upon a larger scale than the others.

Similar numerals indicate like parts in the several views.

1, indicates the lower circular disk and base of the cheese shipping box, and upon which the cheese is formed within the hoop. This base is to be formed of a plurality of boards or planks 2, of a suitable thickness for providing the required strength, and of two courses, 1 and 3, one course with the grain of the wood at approximately right angles with the grain of the other course, and the two courses nailed or otherwise secured together, as with nails 4. The lower course is to be made of a greater diameter than the cheese is to be made, and the upper course of the disk of the diameter of the cheese hoop and mounted concentrically upon the lower course of the disk, the two disks 1 and 3, constituting the lower end piece of the cheese shipping box. Whenever the material of which the disks 1 and 3 are to be made is too thin for the required strength, each disk may be formed of two courses. The joints between the several boards or planks of the disks may be slightly open for permitting the escape of the whey while the curd is being pressed. The disk 1, is to be provided with holes 5, for receiving rods for connecting the disk 1 to a similar one upon the upper end of the hoop.

The hoop 6, is to be made of sheet metal, galvanized, and of a length for surrounding the disk 3, and forming a suitable meeting joint at its ends, such a joint as is shown in Fig. 5 meeting the requirements, one in which one plain end 7 enters and abuts against the bottom of a groove 8, in the other end, the groove being formed by doubling the end of the sheet twice, as is shown in said figure, or the joint shown in Fig. 6 may be used, the groove being formed by securing with solder or rivets the strip 9 to one end of the sheet. The sheet may be pieced for producing the necessary length for the hoop by soldering or riveting two or more pieces together, or one of the joints shown in Figs. 5 and 6 may be used. The width of the sheet, preferably, should be equal to the height required for holding the amount of curd required to form the cheese.

The hoop is to be fitted around the disk 3, and its meeting ends drawn together and held by means of rods 10, which are provided with screw threaded ends, nuts and coupling lugs 11, said lugs being shown in an enlarged view in Figs. 7 and 8. The hoop having been formed as described, and mounted upon its base disks with the hoops or rods 10, around the same, it is ready to be filled with the curd nearly to its upper edge, and to receive the follower 12. The follower is to be made to fit closely the inside of the hoop, and be made of two courses of boards or plank, the length of one being at nearly right angles with the length of the other and the two courses nailed or otherwise secured together. Upon the follower being placed in position upon the curd as is shown in Fig. 2, it may be pressed down in any suitable and convenient manner, as by a screw or screws suitably arranged, or by a plurality of weights distributed over the surface of the follower, in a manner well known to a cheese maker, the whey escaping between joints of the boards or plank of the disks 1 and 3, and in addition to the open joints there may be holes bored through the disks 1 and 3 for the free escape of the whey. The curd having been pressed into a cheese, the surplus width of the hoop above the follower is to be removed by cutting the sheet entirely around the hoop, which can be done with a heavy pair of tinner's snips. The cap piece or disk 13, may now be placed over the upper end of the hoop and upon and concentrically with the follower, it being formed of similar material and in a like manner as the lower disk 1, and nailed or otherwise secured to the follower 12, the two disks forming the upper end piece of the shipping box. Coupling rods 14, are now to be inserted through holes in the cap piece 13, as they have previously been in the disks 1 and 3, and each pair connected by a turn-buckle 15, the turn buckles then being screwed upon the rods until the two end pieces are compressed between the heads 16, of the rods 14, and against the ends of the cheese hoop and upon the cheese therein, when the box and cheese therein are ready to be placed upon a car or other vehicle for transportation.

Having described our invention and the manner of its construction and use, what we claim and desire to secure by Letters Patent, is,—

1. A combined cheese pressing hoop and cheese shipping box, consisting of a lower end piece formed of two circular concentric disks, the outer one larger in diameter than the cheese to be made, and the inner or upper one fitted to the inside of the cheese hoop, a sheet metal cheese hoop mounted loosely around said upper disk with its lower end resting upon the lower disk and being adapted to hold the curd for forming the cheese, a plurality of rods which serve as strengthening hoops around the cheese hoop and means for tightening them around the same, an upper end piece corresponding in diameter, when inverted, in construction, with that of the lower one, mounted concentrically upon the upper end of the hoop, its two disks being disconnected from each other, the lower one placed inside of the hoop and the upper one extended over its upper end, and a plurality of headed rods connecting the outer disks of each end piece by passing through said upper and lower disks, and turn buckles arranged to be screwed upon the rods to clamp the two end pieces upon the ends of the cheese hoop and upon the cheese therein.

2. A combined cheese pressing hoop and cheese shipping box, consisting of a circular base piece or disk of a greater diameter than the cheese to be made and formed of a plurality of boards or planks, a second circular base piece or disk of a diameter corresponding with the diameter of the cheese to be made, mounted above and secured concentrically to the first named base piece and formed of a plurality of boards or planks arranged with their length at right angles with the length of those of the first named disk, a hoop formed of sheet metal arranged around the last named base piece or disk of a suitable width for inclosing sufficient curd to form the cheese to be made, and of a length for surrounding the circumference of the second named base piece or disk, one end of the sheet being plain and adapted to abut against the bottom of a groove formed in the other end of the hoop, a plurality of rods spaced apart, each one being threaded at each end, provided with nuts and a coupling lug and adapted to be screwed up tightly around the hoop, a cap piece corresponding with the diameter of the lower base piece or disk, and when inverted, in construction, mounted upon the upper edge of the hoop, the two disks of which it is formed being normally disconnected from each other, the lower one placed inside of the hoop and the upper one extended over its upper end, and a plurality of rods, each consisting of two pieces, one end of which is provided with a head and the other with threads, and a turn-buckle for connecting each pair of rods and drawing the upper and lower end pieces toward each other and against the ends of the cheese hoop.

3. A combined cheese pressing hoop and cheese shipping box, consisting of upper and lower circular end pieces, each end piece being a disk formed of two boards or planks concentric with each other, the boards or planks of one having their length at an angle with the length of the other, the inner disk of each end piece being of a diameter corresponding substantially with the diameter of the cheese to be made and the outer disk of a greater diameter, the lower one of the upper end piece being normally detached from the upper one, a hoop formed of sheet metal fitted around the outer edges of the inner disk of a width adapted for receiving the curd of which the cheese is to be made, one end of the hoop abutting against the bottom of a groove formed in the other end, a plurality of threaded rods spaced apart, and arranged around the hoop and means for drawing them tightly around the same, and its abutting ends together, and a plurality of devices, each consisting of threaded and headed rods and a turnbuckle arranged for connecting said two end pieces and drawing them tightly upon the upper and lower edges of said cheese hoop, after the surplus width of the hoop has been cut down even with the upper surface of the follower, and after the pressing has been completed.

NICHOLAS SIMON.
NICHOLAS SIMON, Jr.

Witnesses:
ELLEN MERCHANT,
C. M. ALBEE.

Copies of this patent may be obtained for five cents each, by addressing the "Commissioner of Patents, Washington, D. C."